United States Patent
Kudo

(10) Patent No.: US 12,552,588 B2
(45) Date of Patent: Feb. 17, 2026

(54) WATER-SOLUBLE FILM AND CHEMICAL AGENT PACKAGE, AND METHOD FOR PRODUCING CHEMICAL AGENT PACKAGE

(71) Applicant: MITSUBISHI CHEMICAL CORPORATION, Tokyo (JP)

(72) Inventor: Yuuma Kudo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 19/016,360

(22) Filed: Jan. 10, 2025

(65) Prior Publication Data
US 2025/0145353 A1   May 8, 2025

Related U.S. Application Data

(63) Continuation of application No. PCT/JP2023/027743, filed on Jul. 28, 2023.

(30) Foreign Application Priority Data

Jul. 28, 2022   (JP) .................. 2022-120965

(51) Int. Cl.
   *B65D 65/46*   (2006.01)
   *C08J 5/18*   (2006.01)

(52) U.S. Cl.
   CPC .............. *B65D 65/46* (2013.01); *C08J 5/18* (2013.01); *C08J 2329/04* (2013.01)

(58) Field of Classification Search
   CPC ........................... B65D 65/466; B65D 65/46
   USPC ....................................................... 53/456
   See application file for complete search history.

(56) References Cited

U.S. PATENT DOCUMENTS

| | | | | |
|---|---|---|---|---|
| 6,378,274 | B1 * | 4/2002 | Harbour | B65B 11/50 53/427 |
| 8,250,837 | B2 * | 8/2012 | Catlin | C11D 17/043 53/450 |
| 12,140,608 | B2 * | 11/2024 | Hibbs | B64U 50/19 |
| 12,371,540 | B2 * | 7/2025 | Okamoto | C11D 17/042 |
| 2012/0192900 | A1 * | 8/2012 | Wiedemann | B08B 9/20 53/474 |
| 2014/0323383 | A1 | 10/2014 | Trujillo et al. | |
| 2015/0376556 | A1 * | 12/2015 | Ohtani | C11D 3/43 510/386 |
| 2017/0233539 | A1 * | 8/2017 | Friedrich | C11D 17/042 510/296 |
| 2017/0259975 | A1 * | 9/2017 | Yonezawa | C08J 5/18 |
| 2017/0298155 | A1 * | 10/2017 | Takafuji | C09D 129/04 |
| 2017/0355938 | A1 * | 12/2017 | Lee | C11D 17/044 |
| 2018/0245028 | A1 | 8/2018 | Ookubo et al. | |
| 2018/0251613 | A1 | 9/2018 | Hiura et al. | |
| 2018/0251614 | A1 * | 9/2018 | Hiura | B29C 41/003 |
| 2018/0251615 | A1 * | 9/2018 | Oda | B65D 65/46 |
| 2018/0265656 | A1 * | 9/2018 | Oda | B29B 7/88 |
| 2021/0087382 | A1 | 3/2021 | Ieda et al. | |
| 2021/0171882 | A1 * | 6/2021 | Tanikawa | C08K 3/013 |
| 2021/0324156 | A1 * | 10/2021 | Okamoto | B29C 41/26 |
| 2021/0324157 | A1 * | 10/2021 | Okamoto | B41M 5/502 |
| 2021/0324162 | A1 * | 10/2021 | Okamoto | C08J 5/18 |
| 2022/0025303 | A1 * | 1/2022 | Courchay | B29C 65/4895 |
| 2022/0135301 | A1 * | 5/2022 | Okamoto | C08K 5/053 428/156 |

FOREIGN PATENT DOCUMENTS

| | | | |
|---|---|---|---|
| JP | H08-258145 | A | 10/1996 |
| JP | 2016522279 | A | 7/2016 |
| JP | 2017095679 | A | 6/2017 |
| JP | 2017106008 | A | 6/2017 |
| JP | 2017518934 | A | 7/2017 |
| JP | 2019119877 | A | 7/2019 |
| JP | 2020200474 | A | 12/2020 |
| WO | WO-2021067482 | A1 | 4/2021 |

OTHER PUBLICATIONS

English translation of the International Preliminary Report on Patentability and Written Opinion issued Feb. 6, 2025, in PCT/JP2023/027743, 6 pages.

International Search Report issued Oct. 17, 2023 in PCT/JP2023/027743 (with English translation), 5 pages.

Supplementary European Search Report issued Oct. 9, 2025, in corresponding European Patent Application No. 23846670.0, 11 pages.

* cited by examiner

*Primary Examiner* — Gloria R Weeks

(74) *Attorney, Agent, or Firm* — Element IP, PLC

(57) ABSTRACT

A water-soluble polyvinyl alcohol film with excellent conformability to a mold during forming and capable of being formed into a package with excellent appearance is provided. A water-soluble film includes a polyvinyl alcohol resin (A), a plasticizer (B), and a filler (C). The plasticizer (B) is present in a proportion of 3 to 22 parts by mass per 100 parts by mass of the polyvinyl alcohol resin (A), and a mass ratio (B)/(C) between the plasticizer (B) and the filler (C) is 1.5 to 25.

11 Claims, No Drawings

WATER-SOLUBLE FILM AND CHEMICAL AGENT PACKAGE, AND METHOD FOR PRODUCING CHEMICAL AGENT PACKAGE

CROSS-REFERENCE TO RELATED APPLICATIONS

This application is a continuation of International Application No. PCT/JP2023/027743, filed Jul. 28, 2023, the disclosure of which is incorporated herein by reference in its entirety. This application claims priority to Japanese Patent Application No. 2022-120965, filed Jul. 28, 2022, the disclosure of which is incorporated herein by reference in its entirety.

TECHNICAL FIELD

The present disclosure relates to a water-soluble film containing a polyvinyl alcohol resin as a main component, and a chemical agent package. More particularly, the present disclosure relates to a water-soluble film that has excellent conformability to a mold during forming when making a package by packaging a chemical agent such as a liquid detergent and can be formed into a package with excellent appearance, and a chemical agent package, and a method for producing the same.

BACKGROUND ART

Polyvinyl alcohol films are films made of polyvinyl alcohol resins, which are thermoplastic resins and yet water soluble. The polyvinyl alcohol films have been used as water-soluble films that are soluble in water because of water solubility of polyvinyl alcohol and are utilized in a wide variety of fields. Specifically, the polyvinyl alcohol films are used for packaging (unit packaging) applications for chemical agents such as agricultural chemicals and detergents, (water pressure) transfer films, sanitary supplies such as napkins and disposal diapers, waste disposal supplies such as ostomy bags, medical supplies such as blood-absorbing sheets, and temporary base materials for seeding sheets, seeding tapes, and embroidery bases.

Among these, the unit packaging applications for chemical agents such as agricultural chemicals and detergents have advantages of saving time and effort for measuring doses of chemical agents, and preventing contaminations on hands with chemical agents. In particular, unit packaging (individual packaging) has found wider applications in liquid products such as liquid detergents.

For example, a water-soluble film that can be formed into a good package has been proposed, in which the water-soluble film has excellent mechanical strength and, in particular, does not lose tension over time even when formed into a package by packaging a liquid such as a liquid detergent (for example, see PTL 1).

RELATED ART DOCUMENT

Patent Document

PTL 1: JP-A-2017-95679

SUMMARY

Problems to be Solved by the Disclosure

Such individual packages usually have one or more compartments with various shapes and sizes. In recent years, especially in liquid detergent individual packages, packages having compartments with more complicated shapes and sizes have been designed in order to improve washing performance and impart designs.

Unfortunately, when conventional water-soluble films are used for individual packages, the resulting packages suffer poor tension, wrinkles, and/or distorted shapes due to poor conformability of the films to molds, resulting in poor appearance. There is therefore a need for further improvement.

In such a background, the present disclosure provides a water-soluble film that has excellent conformability to a mold during forming when making a package by packaging a chemical agent such as a liquid detergent and can be formed into a package with excellent appearance, and a chemical agent package formed by packaging any of various chemical agents with the water-soluble film. The present disclosure also provides a method for producing the chemical agent package.

Means for Solving the Problems

In such a situation, the inventor of the present disclosure has conducted elaborate studies and found that when a water-soluble film contains a plasticizer and a filler in a particular ratio and the proportion of the plasticizer is within a particular range, a water-soluble film with excellent conformability even in deep drawing or a mold with a complicated shape can be obtained without impairing mechanical properties such as tensile strength and tensile elongation of the film, and that a package kept tensioned and having excellent appearance free from distortion or wrinkles can be obtained by making a package using such a water-soluble film.

More specifically, the present disclosure can be summarized as follows.

[1] A water-soluble film containing a polyvinyl alcohol resin (A), a plasticizer (B), and a filler (C), wherein the plasticizer (B) is present in a proportion of 3 to 22 parts by mass per 100 parts by mass of the polyvinyl alcohol resin (A), and a mass ratio (B)/(C) between the plasticizer (B) and the filler (C) is 1.5 to 25.

[2] The water-soluble film according to [1], wherein the plasticizer (B) contains a polyhydric alcohol (b1) having a melting point equal to or lower than 50° C.

[3] The water-soluble film according to [1] or [2], wherein the polyhydric alcohol (b1) is present in a proportion equal to or more than 70% by mass with respect to the entire plasticizer (B).

[4] The water-soluble film according any one of [1] to [3], wherein the filler (C) is present in a proportion equal to or less than 6 parts by mass per 100 parts by mass of the polyvinyl alcohol resin (A).

[5] The water-soluble film according any one of [1] to [4], wherein the filler (C) contains an organic filler.

[6] The water-soluble film according to any one of [1] or [5], wherein the polyvinyl alcohol resin (A) contains an anionic group-modified polyvinyl alcohol resin (a1).

[7] A chemical agent package including: a package bag formed from the water-soluble film according to any one of [1] to [6]; and a chemical agent packaged in the package bag.

[8] The chemical agent package according to [7], wherein the chemical agent package has a plurality of compartments, and a chemical agent is packaged in at least one compartment.

[9] The chemical agent package according to [7] or [8], wherein the chemical agent is a liquid detergent.

[10] A method for producing a chemical agent package using two or more water-soluble films, the method including vacuum-forming a first water-soluble film in a mold, putting a chemical agent into the first water-soluble film formed by the vacuum-forming, and bonding the formed first water-soluble film to a second water-soluble film to package the chemical agent, wherein the first water-soluble film is the water-soluble film according to any one of [1] to [6].

[11] The method for producing a chemical agent package according to [10], wherein the first water-soluble film formed by the vacuum-forming has a thinnest portion having a thickness equal to or less than 35% of a thickness of the first water-soluble film before the vacuum-forming.

Effects of the Disclosure

The water-soluble film according to the present disclosure has excellent conformability to a mold during forming when a chemical agent such as a liquid detergent is packaged, and can be formed into a package kept tensioned and having excellent appearance free from distortion or wrinkles.

Embodiments of the Disclosure

In the present description, the expression "X to Y" (X and Y are each a given number) is intended to encompass "preferably more than X" or "preferably less than Y" unless otherwise specified, in addition to the meaning of "equal to or more than X and equal to or less than Y".

Further, the expression "X and/or Y" (X and Y are each a given configuration) is intended to mean at least one of X and Y and mean the following three meanings: only X; only Y; and X and Y.

Further, polyvinyl alcohol may be abbreviated as "PVA", a film containing a polyvinyl alcohol resin as a main component may be briefly referred to as "PVA film", and a water-soluble film containing a polyvinyl alcohol resin as a main component may be briefly referred to as "water-soluble PVA film".

Hereinafter, the present disclosure will be specifically described.

A water-soluble film according to an embodiment of the present disclosure (which hereinafter may be referred to as "the present water-soluble film") contains a PVA resin (A), a plasticizer (B), and a filler (C), wherein the plasticizer (B) is present in a proportion of 3 to 22 parts by mass per 100 parts by mass of the polyvinyl alcohol resin (A), and a mass ratio (B)/(C) between the plasticizer (B) and the filler (C) is 1.5 to 25. When a water-soluble film contains a plasticizer and a filler in a particular ratio and the proportion of the plasticizer is within a particular range, a water-soluble film with excellent conformability even in deep drawing or a mold with a complicated shape can be obtained without impairing mechanical properties such as tensile strength and tensile elongation of the film. A package kept tensioned and having excellent appearance free from distortion or wrinkles can be obtained by making a package using such a water-soluble film. Each component and the like of the present water-soluble film will be described below.

[PVA Resin (A)]

The present water-soluble film is a water-soluble film containing the PVA resin (A) as a main component. As used herein "containing the PVA resin (A) as a main component" means that the PVA resin (A) is contained typically in a proportion equal to or more than 50% by mass, preferably equal to or more than 55% by mass, particularly preferably equal to or more than 60% by mass with respect to the entire water-soluble film. If the proportion of the PVA resin (A) is too low, the solubility in water and the mechanical properties of the film tend to be reduced. The upper limit of the proportion of the PVA resin (A) is typically equal to or less than 99% by mass, preferably equal to or less than 95% by mass, particularly preferably equal to or less than 90% by mass, in terms of long-term shape stability when a liquid detergent package is formed.

The "water-soluble film" refers to a film soluble in water at around normal temperature (20° C.). In the present disclosure, the solubility of the film can be evaluated as follows. The water-soluble film is cut into a size of 3 cm×5 cm, which is put into a 1 L beaker containing water (1 L) and fixed with a jig. With the water temperature kept at 20° C., the water is stirred with a stirrer (rotor length 3 cm, rotation speed 750 rpm), and if dispersion of insoluble particles with a diameter of 1 mm or more is not visually recognized, the film is determined as being soluble.

Examples of the PVA resin (A) used in the present water-soluble film include unmodified PVA and modified PVA resin.

The unmodified PVA and the modified PVA resin can be produced using production techniques known in the art and, for example, produced as follows.

The unmodified PVA can be produced by saponifying a vinyl ester polymer obtained by polymerizing a vinyl ester compound.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Vinyl acetate is preferably used. The above vinyl ester compounds can be used alone or in combination of two or more.

The modified PVA resin can be produced by copolymerizing the vinyl ester compound and an unsaturated monomer copolymerizable with the vinyl ester compound, and then saponifying the resulting copolymer.

Examples of the unsaturated monomer copolymerizable with the vinyl ester compound include: olefins such as ethylene, propylene, isobutylene, α-octene, α-dodecene, and α-octadecene; hydroxyl-containing α-olefins such as 3-buten-1-ol, 4-penten-1-ol, and 5-hexen-1-ol, and acylation products and other derivatives of these hydroxyl-containing α-olefins; unsaturated acids such as acrylic acid, methacrylic acid, crotonic acid, maleic acid, maleic anhydride, itaconic acid, and undecylenic acid, and salts, monoesters, and dialkyl esters of these unsaturated acids; amides such as diacetoneacrylamide, acrylamide, and methacrylamide; and olefinsulfonic acids such as ethylenesulfonic acid, allylsulfonic acid, and methallylsulfonic acid, and salts of these olefinsulfonic acids, and N-vinylpyrrolidone. These can be used alone or in combination of two or more.

The modified PVA resin has, for example, a primary hydroxyl group in its side chain. For example, the number of primary hydroxyl groups in the side chain is typically 1 to 5, preferably 1 to 2, particularly preferably 1. Further, the modified PVA resin preferably has a secondary hydroxyl group in addition to the primary hydroxyl group. Examples of the modified PVA resin include a PVA resin having a hydroxyalkyl group in its side chain and a PVA resin having a 1,2-diol structural unit in its side chain. The PVA resin having a 1,2-diol structural unit in its side chain can be produced, for example, by (1) a method in which a copolymer of vinyl acetate and 3,4-diacetoxy-1-butene is saponified; (2) a method in which a copolymer of vinyl acetate and vinyl ethylene carbonate is saponified and decarbonated; (3) a method in which a copolymer of vinyl acetate and 2,2- dialkyl-4-vinyl-1,3-dioxolane is saponified and deketalized; and (4) a method in which a copolymer of vinyl acetate and glycerin monoallyl ether is saponified.

The modified PVA resin used in the present water-soluble film is preferably modified with at least one hydrophilic group selected from carboxy group, sulfonic acid group, phosphoric acid group, pyrrolidone ring group, and the like, in terms of solubility. These modifying groups also include salts such as sodium and potassium of these functional groups. Among these, an anionic group-modified PVA resin is preferably used. Examples of the anionic group include carboxy group, sulfonic acid group, and phosphoric acid group. In terms of long-term stability of solubility, carboxy group and sulfonic acid group are particularly preferred, and carboxy group is even more preferred.

The carboxy group-modified PVA resin can be produced by any method. Examples of the production method include (i) a method in which an unsaturated monomer having a carboxy group and a vinyl ester compound is copolymerized, and then the resulting copolymer is saponified; and (ii) a vinyl ester compound is polymerized with alcohol, aldehyde or thiol having a carboxy group as a chain transfer agent and then the resulting polymer is saponified.

Examples of the unsaturated monomer having a carboxy group in the method (i) include ethylenically unsaturated dicarboxylic acids (maleic acid, fumaric acid, itaconic acid, etc.), or ethylenically unsaturated dicarboxylic acid monoesters (maleic acid monoalkyl ester, fumaric acid monoalkyl ester, itaconic acid monoalkyl ester, etc.), or ethylenically unsaturated dicarboxylic acid diesters (maleic acid dialkyl ester, fumaric acid dialkyl ester, itaconic acid dialkyl ester, etc.) [where these diesters need to be converted to carboxy groups by hydrolysis during saponification of the copolymer], or ethylenically unsaturated carboxylic anhydrides (maleic anhydride, itaconic anhydride, etc.), or ethylenically unsaturated monocarboxylic acid ((meth)acrylic acid, crotonic acid, etc.), and salts of these compounds. Among these, it is preferable to use maleic acid, maleic acid monoalkyl ester, maleic acid dialkyl ester, maleate, maleic anhydride, itaconic acid, itaconic acid monoalkyl ester, itaconic acid dialkyl ester, (meth)acrylic acid, or the like. In particular, it is preferable to use maleic acid, maleic acid monoalkyl ester, maleic acid dialkyl ester, maleate, or maleic anhydride. It is even further preferable to use maleic acid monoalkyl ester. These can be used alone or in combination of two or more.

In the method (ii), a compound derived from the thiol having a greater chain transfer effect is effective, and examples of the compound include compounds represented by the following general formulae (1) to (3).

[Chem. 1]

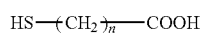

(1)

where n is an integer of 0 to 5.

[Chem. 2]

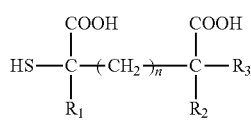

(2)

where n is an integer of 0 to 5, and $R_1$, $R_2$ and $R_3$ each represent a hydrogen atom or a lower alkyl group (which may have a substituent).

[Chem. 3]

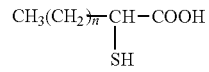

where n is an integer of 0 to 20.

The thiol-derived compound may be a salt of any of the compounds represented by the above general formulae (1) to (3). Specific examples of the salt include mercaptoacetic acid salts, 2-mercaptopropionic acid salts, 3-mercaptopropionic acid salts, and 2-mercaptostearic acid salts. These compounds can be used alone or in combination of two or more.

The carboxy-containing unsaturated monomer and the vinyl ester compound may be polymerized with other general monomer to an extent that does not impair the water solubility. Examples of the general monomer include alkyl esters of ethylenically unsaturated carboxylic acids, allyl esters of saturated carboxylic acids, α-olefins, alkyl vinyl ethers, alkyl allyl ethers, (meth)acrylamide, (meth)acrylonitrile, styrene, and vinyl chloride. These can be used alone or in combination of two or more.

The method for producing the carboxy group-modified PVA resin is not limited to the aforementioned methods. For example, the PVA resin (partially saponified PVA resin or completely saponified PVA resin) may be allowed to post-react with a carboxy-containing compound, such as dicarboxylic acid, aldehyde carboxylic acid, or hydroxycarboxylic acid, having a functional group reactive with a hydroxyl group.

When a sulfonic acid-modified PVA resin modified with a sulfonic acid group is used, the sulfonic acid-modified PVA resin can be produced by copolymerizing the vinyl ester compound with a comonomer such as vinylsulfonic acid, styrenesulfonic acid, allylsulfonic acid, methallylsulfonic acid, or 2-acrylamido-2-methylpropanesulfonic acid and saponifying the resulting copolymer, or by introducing vinylsulfonic acid or its salt, or 2-acrylamido-2-methylpropanesulfonic acid or its salt into the PVA resin by Michael addition reaction.

On the other hand, exemplary methods for post-modification of the unmodified PVA include acetoacetic acid esterification, acetalization, urethanation, etherification, grafting, phosphoric acid esterification, and oxyalkylenation of the unmodified PVA.

The present water-soluble film preferably contains the modified PVA resin, particularly preferably contains the anionic group-modified PVA resin, and even more preferably contains the carboxy group-modified PVA resin, in order to improve the solubility of the film in water, particularly in cold water (for example, 10° C. or lower), or to suppress reduction in solubility over time when the packaged substance is an alkaline substance.

When the carboxy group-modified PVA resin is used in the present water-soluble film, a maleic acid-modified PVA resin or an itaconic acid-modified PVA resin is preferred in terms of handleability and excellent productivity because of high polymerization reactivity with the vinyl ester monomer. In particular, it is preferable to use the maleic acid-modified PVA resin in terms of long-term stability of solubility of the film when a chemical agent is packaged (in particular, the film is less susceptible to the pH of the chemical agent).

The PVA resin (A) preferably has an average saponification degree equal to or more than 80 mol %, particularly preferably 82 to 99.9 mol %, even more preferably 85 to 98.5 mol %, and especially preferably 90 to 97 mol %. If the average saponification degree is too small, the solubility of the film in water tends to be reduced. If the average saponification degree is too large, the water solubility tends to be reduced. In terms of balance between solubility and excellent formability (mold conformability), the average saponification degree is more preferably 90 to 99.9 mol %, particularly preferably 91 to 98.5 mol %, even more preferably 92 to 97 mol %.

The average saponification degree of the PVA resin (A) means that the average saponification degree of the entire PVA resin contained in the water-soluble PVA film is within these ranges. When the water-soluble PVA film contains a plurality of PVA resins, the average saponification degree of the entire PVA resin (A) is obtained by the following formula using the proportion of each PVA resin in the entire PVA resin (A) and the average saponification degree.

average saponification degree of entire PVA resin ($A$)=proportion of PVA resin ($i$)×average saponification degree of PVA resin ($i$)+proportion of PVA resin ($ii$)×average saponification degree of PVA resin ($ii$)+ . . .     (Formula)

In particular, when the unmodified PVA is used as the PVA resin (A), its average saponification degree is preferably equal to or more than 80 mol %, particularly preferably 82 to 99 mol %, even more preferably 85 to 90 mol %. If the average saponification degree is too small, the water solubility, in particular, the long-term solubility of the film tends to be reduced when a chemical agent or the like is packaged. If the average saponification degree is too large, the solubility in water also tends to be reduced.

On the other hand, when the modified PVA resin is used as the PVA resin (A), its average saponification degree is preferably equal to or more than 80 mol %, particularly preferably 85 to 99.9 mol %, even more preferably 90 to 98 mol %. If the average saponification degree is too small, the solubility of the film, in particular, the long-term solubility of the film tends to be reduced when a chemical agent or the like is packaged. If the average saponification degree is too large, the solubility in water also tends to be reduced.

Further, when the anionic group-modified PVA resin is used as the PVA resin (A), its average saponification degree is preferably equal to or more than 85 mol %, particularly preferably 88 to 99 mol %, even more preferably 90 to 98 mol %, especially preferably 92 to 97 mol %. When the saponification degree is within this range, reduction of solubility of the film over time is suppressed and the formability is more excellent. If the average saponification degree is too small, the solubility of the water-soluble film in water tends to be reduced over time, depending on the pH of the chemical agent to be packaged. If the average saponification degree is too large, the solubility in water tends to be reduced.

The average saponification degree is measured in conformity with JIS K 6726 3.5.

The polymerization degree of the PVA resin (A) used in the present water-soluble film can be expressed usually by an aqueous solution viscosity. The PVA resin (A) preferably has a 4 mass % aqueous solution viscosity of 5 to 55 mPa·s, more preferably 10 to 50 mPa·s, particularly preferably 15 to 45 mPa·s, especially preferably 17 to 43 mPa·s, 21 to 40 mPa·s, even more preferably 21.5 to 38 mPa·s, as measured at 20° C.

The 4 mass % aqueous solution viscosity of the PVA resin (A) as measured at 20° C. means that the 4 mass % aqueous solution viscosity of the entire PVA resin contained in the water-soluble PVA film as measured at 20° C. is within these ranges. When the water-soluble film contains a plurality of PVA resins, the 4 mass % aqueous solution viscosity of the entire PVA resin (A) as measured at 20° C. is obtained by the following formula using the proportion of each PVA resin included in the entire PVA resin (A) and the 4 mass % aqueous solution viscosity as measured at 20° C.

4 mass % aqueous solution viscosity of the entire PVA resin ($A$) as measured at 20° C.=proportion of PVA resin ($i$)×4 mass % aqueous solution viscosity of PVA resin ($i$) as measured at 20° C.+proportion of PVA resin ($ii$)×4 mass % aqueous solution viscosity of PVA resin ($ii$) as measured at 20° C.+ . . .     (Formula)

When the unmodified PVA is used as the PVA resin (A), the 4 mass % aqueous solution viscosity as measured at 20° C. is preferably 5 to 60 mPa·s, more preferably 10 to 50 mPa·s, particularly preferably 15 to 45 mPa·s.

When the modified PVA resin is used as the PVA resin (A), the 4 mass % aqueous solution viscosity as measured at 20° C. is preferably 5 to 50 mPa·s, more preferably 15 to 45 mPa·s, particularly preferably 17 to 40 mPa·s, especially preferably 21 to 38 mPa·s, even more preferably 21.5 to 35 mPa·s.

When the viscosity is within this range, the water-soluble film has excellent mechanical strength and excellent formability. If the viscosity is too small, the mechanical strength of the water-soluble film as a packaging material tends to be reduced. On the other hand, if too large, the productivity tends to be reduced.

The 4 mass % aqueous solution viscosity is measured in conformity with JIS K 6726 3.11.2.

The modification degree of the modified PVA resin is preferably 1 to 15 mol %, particularly preferably 1.5 to 12 mol %, even more preferably 2 to 8 mol %. If the modification degree is too small, the solubility in water tends to be reduced, and if too large, the productivity of the PVA resin tends to be reduced, the biodegradability tends to be reduced, and in addition, blocking is more likely to occur.

In the present water-soluble film, the PVA resin (A) may be used alone, or two or more PVA resins different in at least one of saponification degree, viscosity, modifying group, modification degree, and the like can be used in combination. For example, two or more unmodified PVAs may be used in combination, two or more modified PVA resins may be used in combination, one or more unmodified PVAs and one or more modified PVA resins may be used in combination.

Among these, in terms of solubility, the PVA resin (A) preferably contains the modified PVA resin. In terms of water sealability and compression strength of the package, it is preferable to use one or more unmodified PVAs and one or more modified PVA resins in combination. In particular, it is preferable to use one or more unmodified PVAs and one or more anionic group-modified PVA resins in combination.

In order to suppress too early dissolution of the package and further improve the conformability of the film during forming, the PVA resin (A) preferably contains two or more PVA resins with different 4 mass % aqueous solution viscosities as measured at 20° C. Further, the two or more PVA resins are preferably a first PVA resin (a1) as a main component, and a second PVA resin (a2) that satisfies the following condition (α) with respect to the first PVA resin (a1). (α) The PVA resin (a2) has a 4 mass % aqueous solution viscosity (V2) higher than a 4 mass % aqueous solution viscosity (V1) of the PVA resin (a1) as measured at 20° C. (V2>V1).

In order to suppress too early dissolution of the package and further improve the conformability of the film during forming, in particular, the difference (|V2−V1|) in 4 mass % aqueous solution viscosity as measured at 20° C. between the first PVA resin (a1) and the second PVA resin (a2) is preferably equal to or more than 1.5 mPa·s, particularly preferably equal to or more than 2 mPa·s, equal to or more than 3 mPa·s, equal to or more than 5 mPa·s, equal to or more than 10 mPa·s, even more preferably more than 10 mPa·s. The upper limit of the difference in viscosity is preferably equal to or less than 35 mPa·s, preferably equal to or less than 30 mPa·s, more preferably equal to or less than 25 mPa·s.

The first PVA resin (a1) as a main component means a PVA resin present in the largest proportion in the PVA resin.

When two or more first PVA resins as main components are present, that is, two or more PVA resins are present in the same largest proportion in the PVA resin, one of these PVA resins is defined as the first PVA resin (a1) that is a main component of the PVA resin (A), another PVA resin that satisfies the condition (α) is defined as the second PVA resin (a2), and other PVA resin that does not satisfy the condition (α) is defined as a third PVA resin (a3). That is, when any one of the PVA resins is defined as the first PVA resin (a1), it is preferable that the PVA resin (A) contains a PVA resin that satisfies the condition (α) with respect to the first PVA resin (a1). In this case, even when another PVA resin is defined as the first PVA resin (a1), the other PVA resins may contain the second PVA resin (a2) that satisfies the condition (α) (such a PVA resin is the second PVA resin (a2)), and a PVA resin that does not satisfy the condition (α) is the third PVA resin (a3).

The second PVA resin (a2) is a PVA resin that satisfies the condition (α) with respect to the first PVA resin (a1). Such second PVA resins (a2) may be used alone or in combination of two or more. That is, when the PVA resin (A) contains three or more PVA resins, the PVA resin (A) may contain one second PVA resin (a2) or two or more second PVA resins (a2). When the PVA resin (A) contains two or more second PVA resins (a2), these second PVA resins (a2) each may satisfy the condition (α) with respect to the first PVA resin (a1).

The third PVA resin (a3) is selected from unmodified PVAs and modified PVA resins and refers to a PVA resin in which at least one of average saponification degree, viscosity, modifying group, and modification degree is different from those of the first PVA resin (a1) and the second PVA resin (a2). The third PVA resins may be used alone or in combination of two or more.

The first PVA resin (a1) preferably has a 4 mass % aqueous solution viscosity of 5 to 50 mPa·s, more preferably 15 to 45 mPa·s, particularly preferably 17 to 40 mPa·s, especially preferably 21 to 35 mPa·s, even more preferably 21.5 to 30 mPa·s, as measured at 20° C.

When the viscosity is within this range, the film formability is more excellent. If the viscosity is too small, the strength of the water-soluble film as a packaging material tends to be reduced. On the other hand, if too large, the productivity tends to be reduced due to high aqueous solution viscosity during film formation.

The second PVA resin (a2) preferably has a 4 mass % aqueous solution viscosity of 10 to 60 mPa·s, more preferably 15 to 55 mPa·s, particularly preferably 17 to 50 mPa·s, especially preferably 21 to 48 mPa·s, even more preferably 22 to 45 mPa·s, as measured at 20° C.

When the viscosity is within this range, the film formability is more excellent. If the viscosity is too small, the strength of the water-soluble film as a packaging material tends to be reduced, or the dissolution of the film made into a package tends to be too fast. On the other hand, if too large, the productivity tends to be reduced due to high aqueous solution viscosity during film forming.

The mass ratio of the PVA resin (a1) to the PVA resin (a2) (PVA resin (a1)/PVA resin (a2)) is preferably 95/5 to 60/40, particularly preferably 94/6 to 70/30, even more preferably 93/7 to 80/20.

If the proportion of the PVA resin (a2) is too small, the water sealability tends to be reduced, the dissolution of the package tends to be too fast, or the conformability of the film during forming tends to be reduced. If the proportion of the PVA resin (a1) is too small, the solubility tends to be reduced over time.

The PVA resin (a1) preferably has an average saponification degree equal to or more than 80 mol %, particularly preferably 85 to 99 mol %, even more preferably 90 to 98 mol %. If the average saponification degree is too small, the solubility of the water-soluble film in water tends to be reduced. If the average saponification degree is too large, the solubility in water also tends to be reduced.

The PVA resin (a2) preferably has an average saponification degree equal to or more than 80 mol %, particularly preferably 82 to 99 mol %, even more preferably 85 to 90 mol %. If the average saponification degree is too small, the solubility of the water-soluble film in water tends to be reduced. In addition, the uniform stretchability of the film is reduced and the dissolution of the package tends to be too fast. If the average saponification degree is too large, the solubility in water also tends to be reduced.

The absolute value of the difference in average saponification degree between the PVA resin (a1) and the PVA resin (a2) is preferably equal to or less than 8 mol %, more preferably equal to or less than 7 mol %.

If the difference in average saponification degree is too large, the mechanical properties of the film tend to be reduced, or the uniform stretchability of the film is reduced and the dissolution of the package tends to be too fast.

The PVA resin (a1) and the PVA resin (a2) may be any of the following: (1) both of the PVA resin (a1) and the PVA resin (a2) are modified PVA resins; (2) the PVA resin (a1) is a modified PVA resin and the PVA resin (a2) is an unmodified PVA; and (3) both of the PVA resin (a1) and the PVA resin (a2) are unmodified PVAs. In terms of the long-term stability of solubility of the film, the PVA resin (a1) is preferably a modified PVA resin. In terms of the water sealability of the film and the conformability of the film during forming, (2) is preferred. In particular, it is preferable that the PVA resin (a1) is an anionic group-modified PVA resin and the PVA resin (a2) is an unmodified PVA, and especially, it is preferable that the PVA resin (a1) is a carboxy group-modified PVA resin and the PVA resin (a2) is an unmodified PVA.

The modified PVA resin in (1) or (2) above has a modification degree of 1 to 15 mol %, even more preferably 1.5 to 12 mol %, particularly preferably 2 to 8 mol %, especially preferably 2 to 4 mol %.

If the modification degree is too small, the solubility of the film in water tends to be reduced, and if too large, the productivity of the PVA resin tends to be reduced, the biodegradability tends to be reduced, and blocking of the film is more likely to occur.

[Plasticizer (B)]

Examples of the plasticizer (B) used in the present water-soluble film typically include glycerol such as glycerin, diglycerin, and triglycerine, alkylene glycols such as triethylene glycol, polyethylene glycol, polypropylene glycol, dipropylene glycol, and propylene glycol, trimethylolpropane, and sugar alcohols such as sorbitol, xylitol, and maltitol. These may be used alone or in combination of two or more. Among these, glycerin, polyethylene glycol, and diglycerin are preferably used in terms of easy availability and obtaining a plasticizing effect with a small amount.

In the present water-soluble film, it is preferable to use a polyhydric alcohol (b1) (which hereinafter may be briefly referred to as "plasticizer (b1)") having a melting point equal to or lower than 50° C., in terms of conformability of the film to a mold during forming and mechanical properties. Examples of the polyhydric alcohol (b1) having a melting point equal to or lower than 50° C. include aliphatic alcohols, for example, preferably, divalent alcohols such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycol with a molecular weight of 2000 or less, and trivalent and higher-valent alcohols such as glycerin (18° C.), diglycerin, and triethanolamine (21° C.). These can be used alone or in combination of two or more. The numerals in the parentheses each denote a melting point. Among the above compounds, those with a melting point equal to or lower than 30° C. are particularly preferred in terms of flexibility of the water-soluble film, and those with a melting point equal to or lower than 20° C. are even more preferred. The lower limit of the melting point is typically −80° C., preferably −10° C., particularly preferably 0° C.

The plasticizer (b1) preferably has four or less hydroxyl groups in a molecule, particularly preferably three or less hydroxyl groups, in terms of easily controlling the flexibility near normal temperature (25° C.). Specifically, for example, glycerin is preferred.

The plasticizer (b1) preferably has a molecular weight equal to or less than 100, particularly preferably 50 to 100, even more preferably 60 to 95, in terms of easily controlling the flexibility. Specifically, for example, glycerin is preferred.

When two or more plasticizers (B) are used in combination in the present water-soluble film, it is preferable to use a polyhydric alcohol (b2) (which hereinafter may be briefly referred to as "plasticizer (b2)") having a melting point equal to or higher than 80° C., in terms of toughness of the water-soluble film, the long-term shape stability of the formed package, and the like.

As the polyhydric alcohol (b2) having a melting point equal to or higher than 80° C., many of sugar alcohols, monosaccharides, and polysaccharides can be used. Among these, examples of the polyhydric alcohol (b2) include divalent alcohols such as salicyl alcohol (83° C.), catechol (105° C.), resorcinol (110° C.), hydroquinone (172° C.), bisphenol A (158° C.), bisphenol F (162° C.), and neopentyl glycol (127° C.); trivalent alcohols such as phloroglucinol (218° C.); tetravalent alcohols such as erythritol (121° C.), threitol (88° C.), pentaerythritol (260° C.); pentavalent alcohols such as xylitol (92° C.), arabitol (103° C.), fucitol (153° C.), glucose (146° C.), and fructose (104° C.); hexavalent alcohols such as mannitol (166° C.), sorbitol (95° C.), and inositol (225° C.); octavalent alcohols such as lactitol (146° C.), sucrose (186° C.), and trehalose (97° C.); and nonavalent and higher-valent alcohols such as maltitol (145° C.). These can be used alone or in combination of two or more. The numerals in the parentheses each denote a melting point.

Among the above compounds, those with a melting point equal to or higher than 85° C. are preferred in terms of tensile strength of the water-soluble film, and those with a melting point equal to or higher than 90° C. are particularly preferred. The upper limit of the melting point is preferably 300° C., particularly preferably 200° C.

The plasticizer (b2) preferably has four or more hydroxyl groups in a molecule in terms of compatibility with the PVA resin (A), particularly preferably has 5 to 10 hydroxyl groups, even more preferably has 6 to 8 hydroxyl groups. Specifically, for example, sorbitol, sucrose, and trehalose are preferred.

The plasticizer (b2) preferably has a molecular weight of 150 or more, particularly preferably 160 to 500, even more preferably 180 to 400, in terms of toughness of the water-soluble film. Specifically, for example, sorbitol and sucrose are preferred.

The proportion of the plasticizer (B) used in the present water-soluble film needs to be 3 to 22 parts by mass per 100 parts by mass of the PVA resin (A), more preferably 5 to 20 parts by mass, particularly preferably 7 to 18 parts by mass, especially preferably 8 to 16 parts by mass.

If the proportion of the plasticizer (B) is too low, the mechanical properties tend to be insufficient, so that the film becomes too hard or brittle under a low humidity environment, or the conformability of the film during forming tends to be reduced, resulting in poor appearance of the package, or the tension of the formed package tends to be reduced over time.

On the other hand, if the proportion of the plasticizer (B) is too high, the film tends to be excessively soft so that blocking easily occurs or the dimension stability of the package is reduced.

The proportion of the plasticizer (b1) is preferably 3 to 22 parts by mass per 100 parts by mass of the PVA resin (A), particularly preferably 5 to 20 parts by mass, even more preferably 7 to 18 parts by mass, especially preferably 8 to 16 parts by mass.

If the proportion of the plasticizer (b1) is too low, the mechanical properties tend to be reduced or the conformability of the film during forming tends to be reduced, resulting in poor appearance of the package.

The proportion of the plasticizer (b1) in the entire plasticizer (B) is preferably more than 50% by mass, particularly preferably equal to or more than 70% by mass, even more preferably equal to or more than 80% by mass, especially preferably equal to or more than 85% by mass, even more preferably equal to or more than 92% by mass, even more preferably equal to or more than 97% by mass.

If the proportion of the plasticizer (b1) is too low, the mechanical properties tend to be reduced or the conformability of the film during forming tends to be reduced, resulting in poor appearance of the package.

When the plasticizer (b2) is used, the proportion of the plasticizer (b2) is preferably 1 to 10 parts by mass per 100 parts by mass of the PVA resin (A), particularly preferably 1.5 to 8 parts by mass, even more preferably 2 to 6 parts by mass.

If the proportion of the plasticizer (b2) is too low, the tension of the film formed into a package tends to be reduced. If too high, the film mechanical properties and the conformability during forming tend to be reduced, resulting in poor appearance of the package.

[Filler (C)]

Examples of the filler (C) used in the present water-soluble film include organic fillers and inorganic fillers. Among these, organic fillers are preferably used.

The filler (C) preferably has an average particle diameter of 0.1 to 50 μm, particularly preferably 1 to 35 μm. The average particle diameter of the filler (C) is calculated based on a D50 value of cumulative volume distribution (particle diameter of cumulative 50% of particles) measured by a laser diffraction-type particle size distribution measuring device.

The organic filler used in the present water-soluble film refers to a particulate substance (primary particles) of an organic compound in any form such as needle form, bar form, lamellar form, scale form, and spherical form, or an agglomerate (secondary particles) of the particulate substance.

The organic filler is mainly selected from polymer compounds. Examples include melamine resins, polymethyl (meth)acrylate resins, polystyrene resins, starches, polylactic acids, and other biodegradable resins. These can be used alone or in combination of two or more. Among these, polymethyl (meth)acrylate resins, polystyrene resins, and biodegradable resins such as starches are preferred. In particular, starches are preferred in terms of dispersibility in the PVA resin (A).

Examples of the starches include raw starches (corn starch, potato starch, sweet potato starch, wheat starch, cassava starch, sago starch, tapioca starch, sorghum starch, rice starch, pea starch, kudzu starch, bracken starch, lotus starch, water chestnut starch, etc.), physically modified starches (α-starch, fractionated amylose, moist heat-treated starch, etc.), enzyme-modified starches (hydrolyzed dextrin, enzyme-decomposed dextrin, amylose, etc.), chemically degraded starches (acid-treated starch, hypochlorous acid-oxidized starch, dialdehyde starch, etc.), and chemically modified starch derivatives (esterified starch, etherified starch, cationized starch, crosslinked starch, etc.). These can be used alone or in combination of two or more. Among these, the raw starches, particularly corn starch and rice starch, are preferably used in terms of easy availability and cost efficiency.

The organic filler preferably has an average particle diameter of 3 to 50 μm, particularly preferably 10 to 40 μm, even more preferably 15 to 35 μm.

If the average particle diameter is too small, the film is more susceptible to blocking. If too large, the particles of the filler are likely to agglomerate, resulting in poor dispersibility, or the film tends to suffer pinholes when stretched during film processing.

The inorganic filler used in the present water-soluble film refers to a particulate substance (primary particles) of an inorganic compound in any form such as needle form, bar form, lamellar form, scale form, and spherical form, or an agglomerate (secondary particles) of the particulate substance.

Examples of the inorganic filler include inorganic oxide compounds such as silica (silicon dioxide), diatomite, titanium oxide, calcium oxide, magnesium oxide, aluminum oxide, barium oxide, germanium oxide, tin oxide, and zinc oxide, talc, clay, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. These can be used alone or in combination of two or more.

Among the above compounds, the inorganic oxide compounds and talc are preferred, titanium oxide, talc, and silica are even more preferred, and silica is particularly preferred.

The inorganic filler preferably has an average particle diameter of 1 to 20 μm, particularly preferably 2 to 15 μm, even more preferably 3 to 10 μm. If the average particle diameter is too small, the film is more susceptible to blocking, and the flexibility or toughness of the film tends to be reduced. If too large, the water sealability tends to be reduced.

The proportion of the filler (C) is preferably 1 to 30 parts by mass per 100 parts by mass of the PVA resin (A), particularly preferably 2 to 25 parts by mass, even more preferably 2.5 to 20 parts by mass. If the proportion of the filler (C) is too low, the film is more susceptible to blocking. If too high, the flexibility or toughness of the film tends to be reduced.

In terms of the balance between the antiblocking properties of the film and the appearance (transparency, gloss, etc.) of the formed package, and the balance between the antiblocking properties of the film and the formability, the proportion of the filler (C) is preferably equal to or less than 8 parts by mass per 100 parts by mass of the PVA resin (A), particularly preferably equal to or less than 6 parts by mass, even more preferably 0.1 to 5.5 parts by mass, 0.5 to 5.0 parts by mass, 1 to 4.5 parts by mass, 1.5 to 4.0 parts by mass, 2 to 3.5 parts by mass.

In the present water-soluble film, the mass ratio (B)/(C) between the plasticizer (B) and the filler (C) needs to be 1.5 to 25, preferably 1.8 to 23, more preferably 2.0 to 20, particularly preferably 2.2 to 18, even more preferably 2.5 to 15, especially preferably 2.7 to 12.

When the mass ratio is within this range, the conformability to a mold can be improved without impairing the mechanical properties of the film.

If the mass ratio is too small (more filler, less plasticizer), the conformability of the film to a mold tends to be insufficient, resulting in poor appearance of the formed package. If too large (less filler, more plasticizer), the antiblocking properties and mechanical properties of the film tend to be reduced.

[Surfactant (D)]

The present water-soluble film may further contain a surfactant (D) if necessary.

The surfactant (D) is contained in order to improve the peelability from a cast surface during production of the present water-soluble film. Examples include nonionic surfactants, cationic surfactants, and anionic surfactants. Examples of the surfactant (D) include polyoxyethylene nonyl phenyl ether, polyoxyethylene octyl nonyl ether, polyoxyethylene dodecyl phenyl ether, polyoxyethylene alkyl allyl ether, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers such as polyoxyethylene laurylamino ether and polyoxyethylene stearylamino ether. These can be used alone or in combination of two or more. Among these, polyoxyalkylene alkyl ether phosphate monoethanolamine salts and polyoxyethylene laurylamino ether are preferred in terms of production stability.

The proportion of the surfactant (D) is preferably 0.1 to 5 parts by mass per 100 parts by mass of the PVA resin (A), particularly preferably 0.2 to 4.5 parts by mass, even more preferably 0.3 to 4 parts by mass. If the proportion is too low, the peelability of the formed water-soluble film from a cast surface of a film forming apparatus tends to be reduced, resulting in lower productivity. If too high, disadvantageously, the adhesive strength tends to be reduced during sealing performed when the water-soluble film is formed into a package.

It is preferable that the present water-soluble film further contains an antioxidant to an extent that does not impair the object of the present disclosure, in order to suppress yellowing. Examples of the antioxidant include sulfites such as sodium sulfite, potassium sulfite, calcium sulfite, and ammonium sulfite, tartaric acid, ascorbic acid, sodium thiosulfate, catechol, and rongalite. These can be used alone or in combination of two or more. Among these, the sulfites are preferred, and sodium sulfite is particularly preferred. The proportion of the oxidant is preferably 0.1 to 10 parts by mass per 100 parts by mass of the PVA resin (A), even more preferably 0.2 to 5 parts by mass, particularly preferably 0.3 to 3 parts by mass.

The present water-soluble film may further contain perfume, antirust agent, fungicide, colorant, bulking agent, defoaming agent, UV absorber, fluorescent brightener, liquid paraffins, and bitter component (e.g., denatonium benzoate, etc.) to an extent that does not impair the object of the present disclosure. These can be used alone or in combination of two or more.

<Production of Water-Soluble Film>

The water-soluble film is produced by preparing a film-forming material by blending and dissolving or dispersing the PVA resin (A), the plasticizer (B), and the filler (C), and, if necessary, the surfactant (D) and the like in water, and forming a film from the film-forming material as the water-soluble film. The steps for producing the present water-soluble film will be described below.

[Dissolution Step]

In a dissolution step, a PVA resin composition including the blended components above is dissolved or dispersed in water to prepare an aqueous solution or an aqueous dispersion as a film-forming material.

Typically, normal-temperature dissolution, high-temperature resolution, pressure dissolution, or the like is employed as a dissolution method when the PVA resin composition is dissolved in water. Among these, the high-temperature resolution is preferred in terms of less undissolved matter and excellent productivity.

The film-forming material preferably has a solid content of 10 to 65% by mass, particularly preferably 12 to 50% by mass, even more preferably 15 to 40% by mass. If the solid content is too low, the productivity of the film tends to be reduced. If too high, the viscosity tends to be too high, requiring a longer time to defoam the film-forming material or causing die lines during film formation.

[Film Formation Step]

In a film formation step, the film-forming material prepared in the dissolution step is formed into a film, which is dried if necessary to prepare the present water-soluble film having a water content less than 15% by mass.

In the film formation, any method such as melt extrusion and casting can be employed. In terms of accuracy in film thickness, casting is preferred.

In performing casting, for example, the film-forming material is ejected from a slit such as a T-slit die and casted onto a cast surface such as a metal surface of an endless belt or a drum roll, or a polyethylene terephthalate film, or a polypropylene or other plastic substrate. The casted material is then dried to produce the present water-soluble film.

In the film formation step, the present water-soluble film peeled from the cast surface after drying is transported and taken up onto a core, whereby a film roll is prepared.

The resulting film roll can be supplied as it is as a product, but preferably can be slit into a film width with a desired size and supplied as a film roll.

In this way, the present water-soluble film can be produced.

The thickness of the present water-soluble film is selected as appropriate according to applications and the like, preferably 10 to 130 μm, particularly preferably 20 to 110 μm, even more preferably 30 to 100 μm, especially preferably 45 to 90 μm. If the thickness is too small, the mechanical strength of the film tends to be reduced. If the thickness is too large, the speed of dissolution in water tends to be reduced and the film forming efficiency also tends to be reduced.

The width of the present water-soluble film is selected as appropriate according to applications and the like, preferably 300 to 5000 mm, particularly preferably 500 to 4000 mm, even more preferably 600 to 3000 mm. If the width is too small, the production efficiency tends to be reduced. If too large, controlling slackness and film thickness tends to be difficult.

The length of the present water-soluble film is selected as appropriate according to applications and the like, preferably 100 to 20000 m, particularly preferably 800 to 15000 m, even more preferably 1000 to 10000 m. If the length is too small, film switching tends to require time and effort. If the length is too large, tight winding tends to result in poor appearance and heavy weight.

The present water-soluble film may have a smooth surface. However, the film may be subjected to texture processing on one side or both sides, for example, by imparting an emboss pattern, a minute uneven pattern, or a special engraved pattern, in terms of antiblocking properties, sliding properties during processing, reduction in adhesion between the products, and appearance.

The present water-soluble film preferably has a water content of 3 to 15% by mass in terms of mechanical strength and heat sealability, particularly preferably 5 to 10% by mass, even more preferably 6 to 8% by mass. If the water content is too low, the film tends to be too hard, leading to reduction in formability in making a package or reduction in impact resistance of the package, or poor sealing. If too high, blocking tends to occur. The water content can be adjusted by setting drying conditions and moisture control conditions as appropriate.

The water content is measured in conformity with JIS K 6726 3.4, and the resulting volatile content is defined as water content.

The present water-soluble film is useful for various packaging applications, such as unit packaging applications for chemical agents such as agricultural agents and detergents, (water pressure) transfer films, sanitary supplies such as napkins and disposal diapers, waste disposal supplies such as ostomy bags, medical supplies such as blood-absorbing sheets, and temporary base materials for seeding sheets, seeding tapes, and embroidery bases. In particular, the present water-soluble film can be suitably used for unit packaging applications for chemical agents such as laundry detergents and dishwashing detergents.

<Chemical Agent Package>

A chemical agent package, which is an embodiment of the present disclosure, includes a package bag formed from the present water-soluble film, and a chemical agent or the like contained in the package bag. An individual package retains its shape of containing the chemical agent or the like during storage. In use, the package as a whole is put into water. The individual package (the present water-soluble film) comes into contact with water, so that the individual package (the present water-soluble film) is dissolved and the chemical agent or the like is dissolved or dispersed from the individual package into water to fulfill the effect of the chemical agent.

Examples of the chemical agent to be contained include agricultural chemicals such as pesticide, disinfectant, and herbicide, fertilizers, and detergents. Detergents such as laundry detergents and dishwashing detergents are particularly preferred. The chemical agent may be liquid or solid or gel. The liquid chemical agent is in a liquid form. The solid chemical agent may be in a granular form, a tablet form, or a powdery form. The chemical agent is preferably dissolved or dispersed in water for use. In particular, the chemical agent package is useful for packaging a liquid detergent. The pH of the chemical agent may be alkaline, neutral, or acidic.

The liquid detergent preferably has a pH of 6 to 12, particularly preferably 6.5 to 11, even more preferably 7 to 8. The liquid detergent preferably has a water content equal to or less than 15% by mass, particularly preferably 0.1 to 10% by mass, even more preferably 0.1 to 7% by mass. Within such ranges, the water-soluble film is free from gelation or insolubilization and has excellent water solubility.

The pH is measured in conformity with JIS K 3362 8.3. The water content is measured in conformity with JIS K 3362 7.21.3.

The liquid detergent has any viscosity as long as it is a chemical agent in a liquid form that can change its shape with a container, but preferably the liquid detergent has a viscosity of 10 to 200 mPa·s. The viscosity of the liquid chemical agent is measured by a B-type rotational viscometer under normal temperature.

A known method can be employed to produce a chemical agent package by packaging a chemical agent such as liquid detergent using the present water-soluble film. For example, a method for producing a chemical agent package using two or more water-soluble films can be employed, in which a first water-soluble film is vacuum-formed in a mold, a chemical agent is put into the first water-soluble film formed by the vacuum-forming and the formed first water-soluble film is bonded to a second water-soluble film to package the chemical agent. In this method, the present water-soluble film is used as the first water-soluble film.

The first water-soluble film may be a water-soluble film made by laminating two or more water-soluble films. In the first water-soluble film made by laminating two or more water-soluble films, at least one or all of the layers each may be the present water-soluble film. Preferably, all of the layers are each the present water-soluble film. The first water-soluble film made by laminating two or more water-soluble films typically has three or less layers.

The second water-soluble film may be the present water-soluble film or another water-soluble film. Preferably, the second water-soluble film is the present water-soluble film. Specifically, for example, the second water-soluble film may be different from the present water-soluble film in the proportion of the plasticizer (B) and the mass ratio (B)/(C) between the plasticizer (B) and the filler (C), but preferably the second water-soluble film is the present water-soluble film. The second water-soluble film may be a water-soluble film made by laminating two or more water-soluble films. In the second water-soluble film made by laminating two or more water-soluble films, preferably, at least one or all of the layers are each the present water-soluble film. Preferably, all of the layers are each the present water-soluble film. The second water-soluble film made by laminating two or more water-soluble films typically has three or less layers.

The production method using the present water-soluble film can produce a water-soluble film with excellent conformability even when such deep drawing is performed that the thickness of a thinnest portion of the first water-soluble film is 35% or less or 30% or less of the thickness of the first water-soluble film before mold forming. A package formed using such a water-soluble film is kept tensioned and has excellent appearance free from distortion or wrinkles.

More specifically, the package formed using the present water-soluble film is produced by bonding two present water-soluble films together. One of the films (bottom film) is fixed onto a mold at a lower part of a forming apparatus and the other film (top film) is fixed at an upper part of the apparatus. The bottom film is heated by a dryer or a heat roll and vacuum-formed in the mold, and then a chemical agent such as a liquid detergent is put into the formed film. Subsequently, the top film and the bottom film are press-bonded together. After press-bonding, the vacuum is removed, resulting in a package.

Exemplary methods for press-bonding the films include (1) heat sealing method; (2) water sealing method; and (3) adhesive sealing method, among which the water sealing method (2) is advantageous because of versatility and excellent productivity.

Molds of various sizes and shapes can be used according to the kinds and applications of chemical agents. A mold having a plurality of compartments may be used.

The production method can be considered as deep drawing in a case where the film is stretched 2.5 times or more when being formed into a package, or in a case where the thickness of the thinnest portion of the package is 35% or less, preferably 30% or less of the original thickness of the film.

The chemical agent package typically has, for example, a smooth surface. However, the chemical agent package (present water-soluble film) may be subjected to texture processing on its outermost surface, for example, by imparting an emboss pattern, a minute uneven pattern, or a special engraved pattern, in terms of antiblocking properties, sliding properties during processing, reduction in adhesion between the products (packages), and appearance.

The chemical agent retention time in the chemical agent package is typically longer than 30 seconds (until the package is broken). The upper limit of the retention time, which depends on the kinds and usage of chemical agents, is preferably typically 300 seconds or shorter, in the case of a package for a laundry liquid detergent.

The time taken for the chemical agent package to be broken is determined by leaving the chemical agent package in an environment at 23° C. and 50% RH for one day, and then allowing the package to float on ion-exchanged water at 20° C., and measuring the time elapsed until the package is broken and the chemical agent begins to leak.

The shape of the chemical agent package is selected as appropriate and is not limited. Examples of the shape of the chemical agent package include approximate cubic shape, approximate spherical shape, approximate flattened spherical shape, and approximate teardrop shape. The chemical agent package may have a plurality of compartments.

The number of compartments in the chemical agent package is selected as appropriate according to the kinds of chemical agents and the like, and is not limited. For example, the chemical agent package has 2 to 10 compartments, preferably 3 to 8 compartments, more preferably 4 to 6 compartments. The compartments may individually contain different kinds of chemical agents.

The size (capacity, length, width, thickness) of the chemical agent package is selected as appropriate, and the volume of its content is also selected as appropriate.

For example, the chemical agent package has a capacity of typically 1 to 50 mL, preferably 5 to 45 mL, particularly preferably 10 to 40 mL.

The chemical agent package has a thickness of typically 0.5 to 60 mm, preferably 5 to 50 mm, more preferably 10 to 40 mm.

The chemical agent package has a length of typically 10 to 80 mm, preferably 15 to 70 mm, more preferably 20 to 60 mm.

The chemical agent package has a width of typically 10 to 80 mm, preferably 15 to 70 mm, more preferably 20 to 60 mm.

EXAMPLES

The present disclosure will be described more specifically below using examples. However, it should be understood that the present disclosure is not limited to the following examples within the scope of the present disclosure.

In the examples, "parts" and "%" are based on mass.

The following ingredients were prepared for water-soluble films.

Modified PVA resin (a1): carboxy group-modified PVA resin with a 4 mass % aqueous solution viscosity of 22 mPa·s as measured at 20° C., an average saponification degree of 94 mol %, and a monomethyl maleate modification degree of 2.2 mol %

Unmodified PVA (a2): unmodified PVA with a 4 mass % aqueous solution viscosity of 43 mPa·s as measured at 20° C. and an average saponification degree of 88 mol %

Plasticizer (b1): glycerin

Filler (c1): corn starch (average particle diameter of 20 μm)

Surfactant (d1): polyoxyalkylene alkyl ether phosphate monoethanolamine salt

Example 1

First, 90 parts of the modified PVA resin (a1) and 10 parts of the unmodified PVA (a2) as the PVA resin (A), 18 parts of glycerin (b1) as the plasticizer (B), 2 parts of corn starch (c1) as the filler (C), 0.2 parts of polyoxyalkylene alkyl ether phosphate monoethanolamine salt (d1) as the surfactant (D), and water were mixed and these ingredients were dissolved in water to produce a resin composition aqueous dispersion with a solid concentration of 28% as a film-forming material.

The resulting film-forming material was casted on a polyethylene terephthalate film and passed through a drying chamber (105° C.) with a length of 3 m at 0.66 m/min for drying, resulting in a water-soluble film with a thickness of 76 μm and a water content of 8.5%.

Examples 2 to 6, Comparative Example 1

Water-soluble films were each produced in the same way as in Example 1 except that the formulation was changed as listed in Table 1.

Each of the water-soluble films obtained in Examples 1 to 6 and Comparative Example 1 was evaluated according to the method described below. The results are listed in Table 1 below. In Table 1, "-" means not evaluated.

[Conformability]

Each of the obtained water-soluble films (76 μm thick) was left under a moisture-controlled condition at 23° C. and 40% RH for 24 hours, and then formed into a package through the following procedure using a package producing machine available from Engel Corporation. Whether the film conformed to a mold was visually checked during package production.

The water-soluble film (bottom film) was fixed on a mold at a lower part of the apparatus (the size of the package formed: about 45 mm in length, about 42 mm in width, about 36 mm in height), and the water-soluble film (top film) was also fixed on an upper part of the apparatus. Subsequently, the bottom film was vacuum-formed in the mold, and whether the film conformed to the mold was evaluated.

Subsequently, 0.25 g of water was applied throughout the top film surface (80 mm in length, 140 mm in width), and the top film and the bottom film were press-bonded together. After press-bonding for 10 seconds, the vacuum was removed, resulting in a package with no content (the thickness of the thinnest portion: 25 μm).

[Evaluation Criteria]

(Very good) The film conformed sufficiently to the mold in less than 30 seconds.

(Good) There was a slight gap between the film and the mold or it took 30 seconds or longer to conform sufficiently to the mold.

(Poor) The film was clearly separated from the mold and did not conform to the mold.

[Appearance]

The appearance of each of the packages produced in the [Conformability] evaluation was visually observed and evaluated.

[Evaluation Criteria]

(Very good) The package did not have distortion or wrinkles.

(Poor) The package had distortion and/or wrinkles.

[Mechanical Properties]

The tensile strength and the tensile elongation of each of the obtained water-soluble films were measured in conformity with JIS K 7127. The water-soluble film was left under a moisture-controlled condition at 23° C. and 50% RH for 24 hours before measurement. Under this environment, the tensile strength and the tensile elongation of the water-soluble film were measured using AUTOGRAPH AG-X Plus (available from Shimadzu Corporation) at a pulling rate of 200 mm/min (film width 15 mm, distance between chucks 50 mm).

[Evaluation Criteria]

(Very good) The tensile strength was 10 MPa or more, and the tensile elongation was above 300%.

(Good) The tensile strength was 10 MPa or more, and the tensile elongation was 200 to 300%.

(Poor) The tensile strength was 0 to less than 10 MPa, and/or the tensile elongation was less than 200%.

[Solubility]
[20° C. Solubility]

Each of the obtained water-soluble films was cut into a size of 3 cm×5 cm, which was put into a 1 L beaker containing water (1 L) and fixed with a jig. With the water temperature kept at 20° C., the water was stirred with a stirrer (rotor length 3 cm, rotation speed 750 rpm). If dispersion of insoluble particles with a diameter of 1 mm or more was not visually recognized, the film was determined as being soluble. The time taken for dissolution was evaluated.

[Evaluation Criteria]
(Very good) The film was dissolved in less than 90 seconds.
(Good) The film was dissolved in 90 seconds to 300 seconds.
(Poor) The film was not dissolved even after 300 seconds.

[10° C. Solubility]

Each of the obtained water-soluble films was cut into a size of 3 cm×5 cm, which was put into a 1 L beaker containing water (1 L) and fixed with a jig. With the water temperature kept at 10° C., the water was stirred with a stirrer (rotor length 3 cm, rotation speed 750 rpm). If dispersion of insoluble particles with a diameter of 1 mm or more was not visually recognized, the film was determined as being soluble. The time taken for dissolution was evaluated.

[Evaluation Criteria]
(Excellent) The film was dissolved in less than 90 seconds.
(Very good) The film was dissolved in 90 seconds to less than 120 seconds.
(Good) The film was dissolved in 120 seconds to 300 seconds.
(Poor) The film was not dissolved even after 300 seconds.

[Haze]

Each of the obtained water-soluble films was cut into a size of 5 cm×5 cm, and the haze of the cut film was measured using a haze meter NDH4000 (available from NIPPON DENSHOKU INDUSTRIES CO., LTD.) in conformity with JIS K 7136.

[Glossiness]

Each of the obtained water-soluble films was left under a moisture-controlled condition at 23° C. and 40% RH for 24 hours, and then formed into a chemical agent package through the following procedure using a package producing machine available from Engel Corporation.

The water-soluble film (bottom film) was fixed on a mold at a lower part of the apparatus (the size of the package formed: about 45 mm in length, about 42 mm in width, about 30 mm in height), and the water-soluble film (top film) was also fixed on an upper part of the apparatus. The bottom film was heated for 4 seconds with a dryer that produces hot air at 70° C., and the bottom film was vacuum-formed in a mold. Subsequently, 25 mL of a commercially available laundry detergent (formulation: 11% of propylene glycol, 7.5% of glycerin, 67% of a surfactant, and 14.2% of water, with a pH of 7.5) was put into the formed water-soluble film. Then, 0.25 g of water was applied throughout the top film surface (80 mm in length, 140 mm in width), and the top film and the bottom film were press-bonded together. After press-bonding for 10 seconds, the vacuum was removed, resulting in a chemical agent package which was a liquid detergent package.

The resulting liquid detergent package was put on black paper. A glossmeter micro-TRI-gloss (available from BYK-Gardner) was lightly pushed horizontally against the top portion on the bottom film to measure glossiness. This operation was repeated 10 times and the average of measurements was calculated. The measurement was in conformity with JIS Z 8741 at an incident angle of 60° under a moisture-controlled condition at 23° C. and 40% RH.

[Compression Strength]

Each of the obtained water-soluble films was left under a moisture-controlled condition at 23° C. and 40% RH for 24 hours, and then formed into a chemical agent package through the following procedure using a package producing machine available from Engel Corporation.

The water-soluble film (bottom film) was fixed on a mold at a lower part of the apparatus (the size of the package formed: about 45 mm in length, about 42 mm in width, about 30 mm in height), and the water-soluble film (top film) was also fixed on an upper part of the apparatus. The bottom film was heated for 4 seconds with a dryer that produces hot air at 70° C., and the bottom film was vacuum-formed in a mold. Subsequently, 25 mL of a commercially available laundry detergent (formulation: 11% of propylene glycol, 7.5% of glycerin, 67% of a surfactant, and 14.2% of water, with a pH of 7.5) was put into the formed water-soluble film. Then, 0.25 g of water was applied throughout the top film surface (80 mm in length, 140 mm in width), and the top film and the bottom film were press-bonded together. After press-bonding for 10 seconds, the vacuum was removed, resulting in a chemical agent package which was a liquid detergent package.

The compression strength of the resulting liquid detergent package was evaluated according to the following method. The results are listed in Table 1 below.

[Evaluation Method]

The liquid detergent package produced by the method above was left under a moisture-controlled condition at 23° C. and 40% RH for one hour. Under this environment, the compression strength at break of the liquid detergent package was measured at a testing rate of 200 mm/min using AUTOGRAPH AG-X Plus (available from Shimadzu Corporation). A load cell of 5 kN was used.

[Evaluation Criteria]
(Very good) The compression strength was above 1000 N.
(Good) The compression strength was 300 to 1000 N.
(Poor) The compression strength was less than 300 N and the package was easily broken, or the package was broken because the seal surface was easily peeled.

TABLE 1

| | PVA resin (A) | Plasticizer (B) | Filler (C) | (B)/(C) |
|---|---|---|---|---|
| Ex. 1 | PVA resin (a1) 90 parts PVA resin (a2) 10 parts | Glycerin (b1) 18 parts | Corn starch (c1) 2 parts | 9.0 |
| Ex. 2 | PVA resin (a1) 90 parts | Glycerin (b1) 15.6 parts | Corn starch (c1) 8 parts | 2.0 |

TABLE 1-continued

| | | | | |
|---|---|---|---|---|
| Ex. 3 | PVA resin (a2) 10 parts PVA resin (a1) 100 parts | Glycerin (b1) 20 parts | Corn starch (c1) 2 parts | 10 |
| Ex. 4 | PVA resin (a1) 100 parts | Glycerin (b1) 18 parts | Corn starch (c1) 2 parts | 9.0 |
| Ex. 5 | PVA resin (a1) 100 parts | Glycerin (b1) 15.6 parts | Corn starch (c1) 2 parts | 7.8 |
| Ex. 6 | PVA resin (a1) 100 parts | Glycerin (b1) 15.6 parts | Corn starch (c1) 8 parts | 2.0 |
| Comp. Ex. 1 | PVA resin (a1) 90 parts PVA resin (a2) 10 parts | Glycerin (b1) 8 parts | Corn starch (c1) 8 parts | 1.0 |

| | Water-soluble film | | | | |
|---|---|---|---|---|---|
| | Thickness (μm) | Conformability | Mechanical properties | Solubility 20° C. / 10° C. | Haze |
| Ex. 1 | 76 | Very good | Very good | Very good / — | — |
| Ex. 2 | 76 | Very good | Very good | Very good / Very good | 27.5 |
| Ex. 3 | 73 | Very good | Very good | Very good / — | 9.2 |
| Ex. 4 | 71 | Very good | Very good | Very good / Excellent | 9.0 |
| Ex. 5 | 74 | Very good | Very good | Very good / Excellent | 9.6 |
| Ex. 6 | 73 | Very good | Very good | Very good / Very good | 25.3 |
| Comp. Ex. 1 | 76 | Poor | Good | Very good / — | — |

| | Package | | |
|---|---|---|---|
| | Appearance | Glossiness (60°) | Compression strength |
| Ex. 1 | Very good | — | Very good |
| Ex. 2 | Very good | — | Very good |
| Ex. 3 | Very good | 9.1 | — |
| Ex. 4 | Very good | 10.0 | — |
| Ex. 5 | Very good | 11.1 | — |
| Ex. 6 | Very good | 6.4 | — |
| Comp. Ex. 1 | Poor | — | Good |

The results in Table 1 indicate that the water-soluble films of Examples 1 to 6 that satisfy the formulation defined in the present disclosure are excellent in conformability to a mold during forming a package and in mechanical properties, and that the packages obtained by forming the film by deep drawing have excellent appearance free from distortion or wrinkles and have sufficient compression strength, and therefore are suitable for packaging applications. It is understood that none of the chemical agent packages were easily peeled at seal surfaces and broken in the compression strength evaluation, that is, the chemical agent packages have excellent water sealability.

In contrast, the chemical agent package formed using the water-soluble film of Comparative Example 1 that did not satisfy the formulation defined in the present disclosure had insufficient conformability to the mold and the resulting package had poor appearance with distortion.

While specific forms of the embodiments of the present disclosure have been shown in the above examples, the examples are merely illustrative and should not be interpreted in a limited sense. It is contemplated that various modifications apparent to those skilled in the art could be made within the scope of the present disclosure.

INDUSTRIAL APPLICABILITY

The water-soluble film according to the present disclosure has excellent conformability to a mold during forming and can be formed into a package with excellent appearance. The water-soluble film according to the present disclosure can be used for various packaging applications and is useful in particular for unit packaging applications for chemical agents and the like.

The invention claimed is:

1. A water-soluble film, comprising:
   a polyvinyl alcohol resin (A),
   a plasticizer (B), and
   a filler (C),
   wherein:
   the plasticizer (B) is present in a proportion of 3 to 22 parts by mass per 100 parts by mass of the polyvinyl alcohol resin (A), and
   a mass ratio (B)/(C) of the plasticizer (B) to the filler (C) is 1.5 to 25.

2. The water-soluble film according to claim 1, wherein the plasticizer (B) comprises a polyhydric alcohol (b1) having a melting point equal to or lower than 50° C.

3. The water-soluble film according to claim 2, wherein the polyhydric alcohol (b1) is present in a proportion equal to or more than 70% by mass with respect a total mass of the plasticizer (B).

4. The water-soluble film according to claim 1, wherein the filler (C) is present in a proportion equal to or less than 6 parts by mass per 100 parts by mass of the polyvinyl alcohol resin (A).

5. The water-soluble film according to claim 1, wherein the filler (C) comprises an organic filler.

6. The water-soluble film according to claim 1, wherein the polyvinyl alcohol resin (A) comprises an anionic group-modified polyvinyl alcohol resin (a1).

7. A chemical agent package comprising:
 a package bag comprising the water-soluble film according to claim 1; and
 a chemical agent present in the package bag.

8. The chemical agent package according to claim 7, wherein
 the chemical agent package has a plurality of compartments, and
 a chemical agent is present in at least one compartment.

9. The chemical agent package according to claim 7, wherein the chemical agent comprises a liquid detergent.

10. A method for producing a chemical agent package, comprising:
 vacuum-forming a first water-soluble film in a mold,
 putting a chemical agent into the first water-soluble film formed by the vacuum-forming, and
 bonding the formed first water-soluble film to a second water-soluble film to package the chemical agent,
 wherein the first water-soluble film comprises the water-soluble film according to claim 1.

11. The method for producing a chemical agent package according to claim 10, wherein the first water-soluble film formed by vacuum-forming has a thinnest portion having a thickness equal to or less than 35% of a thickness of the first water-soluble film before vacuum-forming.

* * * * *